Sept. 3, 1946.  L. W. COLE ET AL  2,407,142
BUS DUCT
Filed Nov. 17, 1942
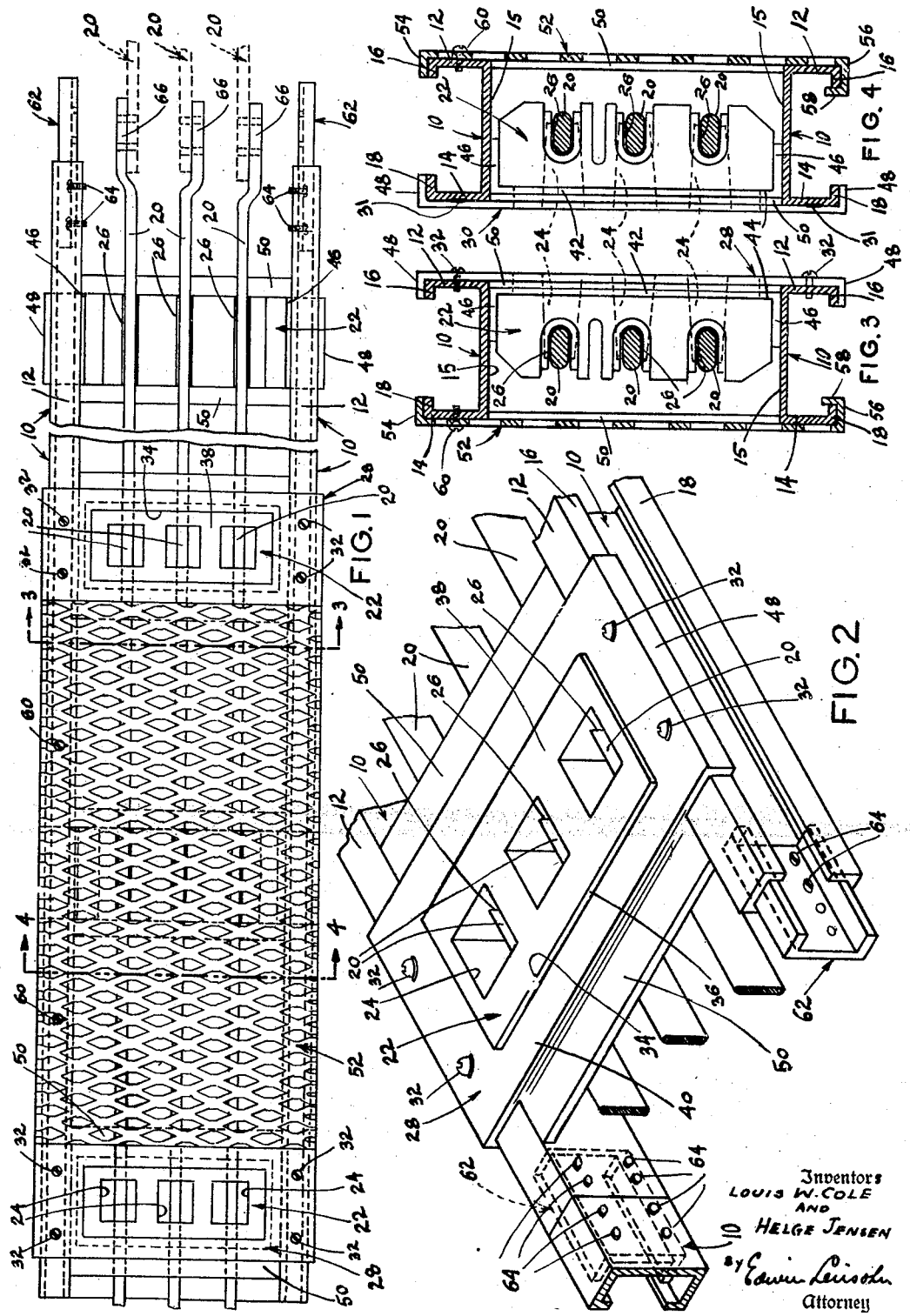
Inventors
LOUIS W. COLE
AND
HELGE JENSEN
By Edwin Levisohn
Attorney

UNITED STATES PATENT OFFICE 2,407,142

BUS DUCT

Louis W. Cole, New York, and Helge Jensen, Flushing, N. Y., assignors to Cole Industries, Inc., Long Island City, N. Y., a corporation of New York Application November 17, 1942, Serial No. 465,882

6 Claims. (Cl. 173—334.1)

This invention relates to plug-in bus-ducts for electrical distribution systems.

The primary object of the present invention is the provision of a bus-duct of such construction that the quantity of steel and/or copper for the duct and bus bars, respectively, or the quantity of other metals of which the duct and bars are formed is considerably reduced, for the same current capacity of the bus bars, in comparison with the bus-ducts of the prior art.

In accordance with the present invention, the bus-duct is of such construction that the interior of the duct is open to the ambient atmosphere externally of the duct, whereby the bare bus bars in the duct are exposed to the cooling action of the ambient atmosphere. Pursuant to this invention, the quantity of metal of which the duct itself is formed can be substantially reduced while the bus bars may be of the same size as those provided in enclosed ducts, and further pursuant to this invention the quantity of copper required for the bus bars can be substantially reduced and a yet greater saving in the quantity of metal required for the duct itself can be effected with reduction in the size of the bus bars, for the same temperature rise as in the enclosed bus-duct.

The present invention and the objects, features and advantages thereof will be more fully understood from the following description considered in connection with the accompanying illustrative drawing.

In the drawing:

Fig. 1 is a side view of a length or section of bus-duct embodying the present invention, parts being omitted for the purpose of illustration;

Fig. 2 is a perspective view of a part of the bus-duct shown in Fig. 1;

Fig. 3 is a sectional view, on the line 3—3 of Fig. 1, with parts omitted for the purpose of illustration;

Fig. 4 is a sectional view, on the line 4—4 of Fig. 1, with parts omitted for the purpose of illustration.

Referring now to the drawing in detail, the bus-duct embodying the present invention comprises a pair of longitudinal members 10 disposed in laterally spaced parallel relation and extending longitudinally of the duct. Said longitudinal members 10 are preferably formed of sheet steel and are each provided with outturned flanges 12 and 14 projecting at right angle to the main walls 15 of said members and extending continuously for the full length thereof. Said flanges 12 and 14 are provided with reflexed portions 16 and 18, respectively, forming lips co-extensive in length with the companion flanges. The flat bare bus bars 20, preferably formed of copper, are mounted in the space between confronting walls 15 of the pair of longitudinal members 10 and extend longitudinally of the duct. More particularly, said bus bars are mounted at equal distances from each other and at equal distances from the opposite sides of the duct, provision being made for the electrical connection to said bus bars of the prongs of branch outlet plugs which may be plugged into the duct from either or both sides thereof. The bus bars are supported by insulation blocks 22 disposed in longitudinally spaced relation between longitudinal members 10. Said bus-bar supporting blocks 22 are each provided with a plurality of laterally spaced plug-receiving openings 24 which communicate with slots 26 in the inner ends of said blocks, in which the bus bars 20 are received. The slots 26 are preferably only slightly wider than the thickness of the bus bars, respectively, whereby the opposite sides of each bar are frictionally engaged by, or lie closely adjacent to, the opposite sides, respectively, of the companion slots 26. The bus bar supporting and plug-receiving blocks 22 are preferably of the construction shown and described in our application Ser. No. 410,143 which has matured into United States Letters Patent No. 2,306,353, issued to the assignee of our present application. It will be understood that the prongs of the branch outlet plugs are received within openings 24 and engage the opposite sides of the bus-bars in said openings, respectively, as illustrated in said application. Also, it will be understood that the bus-bars are held by blocks 22 with the flat faces of said bars transverse or at right angles to the planes of openings 24 and are in other respects as well supported by blocks 22 in the same way as in the bus-duct illustrated in said patent.

The manner in which longitudinal members 10 are secured in duct-defining relation and the manner in which blocks 22 are mounted in position will now be described. The means provided for this purpose comprises transversely extending metal plates 28 disposed at one side of the duct in spaced relation longitudinally thereof and similar plates 30 disposed at the opposite sides of the duct in spaced relation longitudinally thereof and in spaced relation longitudinally of plates 28 at the first mentioned side of the duct. Plates 30 are preferably secured to longitudinal members 10 and more particularly to the flanges 14 of said members by spot welding said plates to said flanges as indicated at 31 in Fig. 4. Plates 28 are removably secured to longitudinal members 10, preferably by means of screws 32 which are threaded through said plates and flanges 12 of members 10. Plates 28 and 30 are of the same construction and are associated with longitudinal members 10 in the same way except that, as stated, plates 30 are welded to members 10 while plates 28 are removably secured to said members by screws 32 or in any other suitable way. Accordingly, a more detailed description of plate 28 will also apply to plate 30. Each of said plates has a rectangular opening 34 in which the peripheral lip 36 of the companion block 22 is received, the outer surface 38 of the block projecting slightly beyond the outer surface 40 of the plate surrounding opening 34 therethrough. A felt cushioning member 42 is disposed between the peripheral shoulder 44 of the insulation block and the inner surface of plate 28, and end portions 46 of the felt member are disposed between the opposite ends of block 22 and the adjacent surfaces of longitudinal members 10, respectively. Each of the plates 28 and 30 extends transversely of the duct and when secured to longitudinal members 10 hold the latter rigidly in duct-defining position. Preferably, each of said plates is provided with end flanges 48 which abut the adjacent lips 16 and 18 of flanges 12 or 14 of longitudinal members 10 and aid in holding the latter against movement away from each other. Also, as here shown, each of plates 28 and 30 is provided with integral lateral extensions 50 pressed inwardly to lie between walls 15 of members 10 with their outer surfaces in the plane of outer surfaces of adjacent flanges 12 or 14 of longitudinal members 10 and with their ends in engagement with the confronting walls, respectively, of said longitudinal members, thus holding the latter against movement toward each other.

In view of the above description, considered with reference to the drawing, it will be understood that the interior of the bus-duct is open to the ambient atmosphere at the spaces between the longitudinally spaced plates 28 and 30 at the opposite sides of the duct, whereby the heat generated by the current flowing in bus bars 20 is more effectively radiated and dissipated than in the case of bus bars in an enclosed duct. Preferably, however, perforated guard plates 52 are disposed in the spaces between adjacent plates 28 at one side of the duct and between the plates 30 at the opposite side of the duct. Said plates are preferably formed of expanded sheet metal, as illustrated, and secured to longitudinal members 10 with the opposite ends of each plate 52 overlapping the adjacent lateral extension 50 of the adjacent plate 28 or 30, as the case may be. The outer surface of plate 52 is preferably substantially flush with the outer surface 40 of adjacent plates 28 or 30. Plates 52 are provided with inturned flanges 54 and 56 which abut the adjacent lips 16 and 18 of longitudinal members 10, and flange 56 is provided with a lip 58 which underlies the adjacent flange 16 or 18, as the case may be, for holding one end of plate 52 in position while the other end thereof is removably secured to flanges 12 or 14, as the case may be, in any suitable way as by screws 60. It will be understood that plates 52 can be easily removed from the duct by unfastening screws 60 and that said plates can be easily secured to the duct by engaging lips 58 over the edges of lips 16 or 18, as the case may be, and thereafter fastening the opposite end of said plates to flanges 12 or 14 by screws 60.

With a duct constructed as hereinbefore described, the amount of copper or other metal of which the bus bars are made can be substantially less than that required for bus bars of the same rating in an enclosed duct, since the said bus bars run cooler for the same current-carrying capacity than an enclosed duct. Further, it will be understood that the decrease in the required size of the bus bars also results in a substantial reduction in the size of the longitudinal members 12 as compared with the size of said members in an enclosed duct, and in addition, it will be understood that whether or not the bus bars are of the same size in comparison with bus bars of equal current rating in an enclosed duct, a further reduction in the quantity of the metal is effected in the construction of the duct itself.

It will be understood that when the duct is installed, it will comprise a plurality of connected adjacent lengths or duct sections, only one of said lengths or duct sections being illustrated in Fig. 1. For this purpose, adjacent lengths of duct can be easily connected to each other by the splice plates 62, illustrated in Figs. 1 and 2, said splice plates being secured to adjacent longitudinal members 10 in any suitable way as by a plurality of screws 64. Also it will be understood that the bus bars 20 are approximately of the same length as the section of bus duct within which said bars are positioned and for facilitating the electrical securement of the bus bars of one section to the bus bars of an adjacent section, said bus bars are each provided at one end thereof with off-set portions 66 for the securement thereto of the adjacent ends of bus bars 20 positioned in the adjacent duct section. Access to the duct for connecting the bus bars 20 of adjacent sections to each other can be readily had by removing the plate 52 at that part of the duct.

While we have shown and described the preferred embodiment of our invention, it will be understood that the latter may be embodied otherwise than as herein shown or described and that in the illustrated embodiment certain changes in the details of construction and in the arrangement of parts may be made without departing from the underlying idea of the present invention. It will be understood further that while the use of guard plates 52 is preferred, said plates can be omitted. Also, it will be understood that plates 52 need not be made of metal, but can be formed of other materials, for example, fibre board, perforated to provide the openings therethrough for opening the interior of the duct to the ambient atmosphere. Also, it will be understood that when plates 52 are made of metal and are, in that case, preferably formed of expanding sheet metal, said plates can be otherwise provided with a multiplicity of perforations or openings therethrough to allow communication of the interior of the duct with the ambient atmosphere externally thereof and at the same time to constitute a guard for the bus bars within the duct. Finally, it will be understood that other parts of the duct may vary in respect to various details of construction. Accordingly, we do not wish to be limited to the construction as herein specifically shown or described except to the extent which may be required by the scope of the appended claims.

Having thus described our invention, what we claim and desire to secure by Letters Patent is:

1. A plug-in bus-duct comprising a pair of longitudinal members secured in laterally spaced parallel relation, said members having outwardly projecting flanges at their longitudinal side edges, the flanges at one side of the duct lying in a plane parallel to the flanges at the opposite side of the duct, a plurality of longitudinally spaced transverse members disposed at each of said sides of the duct and secured to said flanges at the same side of the duct, said transverse members having plug-receiving openings, said transverse members at one side of the duct being laterally offset from said transverse members at the opposite side of the duct, and insulation members positioned in the duct in longitudinally spaced relation between said longitudinal members for supporting a bus bar in the duct with the flat face of the bar in a plane at right angles to the plane of said openings for engagement by the plugs projected into the duct through said openings, certain of said insulation members being positioned adjacent one of said sides of the duct and spaced from the opposite side of the duct inwardly thereof and the other insulation members being positioned adjacent said opposite side of the duct and spaced from said one of the sides of the duct inwardly thereof whereby the duct has a continuous opening therein longitudinally of the duct, the interior of the duct being open to the ambient atmosphere externally of the duct at the opposite sides thereof through the spaces between said transverse members.

2. A plug-in bus-duct comprising a pair of longitudinal members disposed in laterally spaced parallel relation, a plurality of longitudinally spaced transverse members extending between said longitudinal members at each of two opposite sides of the duct and connecting said longitudinal members and holding them in said relation, said transverse members being provided with plug-receiving openings, and insulation members positioned in the duct in longitudinally spaced relation between said longitudinal members for supporting a bus bar in the duct with the flat face of the bar in a plane at right angles to the plane of said openings for engagement by the plugs projected into the duct through said openings, certain of said insulation members being positioned adjacent one of said sides of the duct and spaced from the opposite side of the duct inwardly thereof and the other insulation members being positioned adjacent said opposite side of the duct and spaced from said one of the sides of the duct inwardly thereof whereby the duct has a continuous opening therein longitudinally of the duct, and perforated plates secured in position at the opposite sides of the duct in the spaces between said longitudinally spaced transverse members at the same side of the duct, the interior of the duct being open to the external ambient atmosphere through the perforations of said plates in the spaces between said transverse members.

3. A bus-duct comprising a pair of longitudinal members disposed in laterally spaced relation, each of said members having a main wall parallel to the main wall of the other longitudinal member and in confronting surface relation thereto, a plurality of longitudinally spaced transverse members extending between said longitudinal members and secured thereto at one side of the duct, a plurality of longitudinally spaced transverse members extending between said longitudinal members and secured thereto at the opposite side of the duct, said plates having laterally projecting portions extending between and having their opposite ends in engagement with said confronting wall surfaces, respectively, to prevent movement of said longitudinal members toward each other, and a plurality of bus bars supported in position in the space between said longitudinal members and transverse members at the opposite sides of the duct, the interior of the duct being open to the ambient atmosphere externally of the duct through the spaces between said transverse members.

4. A plug-in bus duct comprising a pair of longitudinal members disposed in laterally spaced parallel relation, a plurality of plates disposed at opposite sides of the duct in spaced relation longitudinally thereof and individually secured at their opposite ends to said longitudinal members, respectively, for securing said members in said relation, bus bars in the space between said longitudinal members, said plates having openings for receiving branch-outlet plugs projected through said openings for electrical connection with said bus bars, and insulation blocks disposed between said longitudinal members and engaging said plates in said openings, respectively, and thereby releasably held against movement longitudinally of the duct, said bus bars engaging said blocks and thereby held in position and said blocks having openings through which said bus bars project and which register with said plate openings, said plates having inwardly offset lateral projections, and guard plates mounted on said longitudinal members in the spaces between said first mentioned plates and having their opposite end portions overlapping said lateral projections of adjacent plates.

5. In a bus-duct, a longitudinally extending duct in which the buses are positioned, said duct comprising a pair of longitudinal members disposed in laterally spaced relation, each of said members having a main wall and flanges projecting outwardly from said main wall at the opposite edges thereof, said main walls of the two longitudinal members being in confronting surface relation, and a plurality of plates disposed at the opposite sides of the duct in spaced relation longitudinally thereof, and secured at their opposite ends to the adjacent flanges, respectively, of said longitudinal members, said plates having laterally projecting portions extending between and having their opposite ends in engagement with said confronting wall surfaces, respectively, to prevent movement of said longitudinal members toward each other, said plates having flanges at their opposite ends engaging the ends of adjacent flanges, respectively, of said longitudinal members to hold the latter against movement away from each other.

6. In a bus-duct, a longitudinally extending duct in which the buses are positioned, said duct comprising a pair of longitudinal members disposed in laterally spaced relation, each of said members having a main wall and flanges projecting outwardly from said main wall at the opposite edges thereof, said main walls of the two longitudinal members being in confronting surface relation, and a plurality of plates disposed at the opposite sides of the duct in spaced relation longitudinally thereof, and secured at their opposite ends to the adjacent flanges, respectively, of said longitudinal members, said plates having laterally projecting portions extending between and having their opposite ends in engagement with said confronting wall surfaces, respectively, to prevent movement of said longitudinal members toward each other, said plates having flanges at their opposite ends engaging the ends of adjacent flanges, respectively, of said longitudinal members to hold the latter against movement away from each other, and guard plates mounted on said longitudinal members in the spaces between said first mentioned plates and having their opposite end portions overlapping the lateral projections of adjacent plates.

LOUIS W. COLE.
HELGE JENSEN.